US010891508B2

(12) United States Patent
Fujimori et al.

(10) Patent No.: US 10,891,508 B2
(45) Date of Patent: Jan. 12, 2021

(54) IMAGE PROCESSING APPARATUS, METHOD, AND NON-TRANSITORY COMPUTER-READABLE STORAGE MEDIUM

(71) Applicant: CANON KABUSHIKI KAISHA, Tokyo (JP)

(72) Inventors: Tomotaka Fujimori, Yokohama (JP); Yusuke Mitarai, Tokyo (JP); Masafumi Takimoto, Kawasaki (JP); Hiroshi Okuda, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 16/139,553

(22) Filed: Sep. 24, 2018

(65) Prior Publication Data

US 2019/0095742 A1    Mar. 28, 2019

(30) Foreign Application Priority Data

Sep. 26, 2017    (JP) .................................. 2017-185321

(51) Int. Cl.
*G06K 9/32*        (2006.01)
*G06T 7/73*        (2017.01)
(Continued)

(52) U.S. Cl.
CPC ....... *G06K 9/3241* (2013.01); *G01N 21/8851* (2013.01); *G01N 21/89* (2013.01);
(Continued)

(58) Field of Classification Search
CPC ............. G06K 9/3241; G06K 9/00228; G06K 9/4604; G06K 9/346; G06K 9/0014;
G06T 7/74; G06T 7/529; G06T 7/521; G06T 5/002; G06T 5/50; G01N 21/8851; G01N 21/89
(Continued)

(56) References Cited

U.S. PATENT DOCUMENTS 7,049,617 B2    5/2006  Iriguchi
2003/0118149 A1*  6/2003  Okuda .................. G06T 7/0004
                                    378/58
(Continued)

FOREIGN PATENT DOCUMENTS

| JP | 2005102862 A | 4/2005 |
|----|----|----|
| JP | 4861605 B2 | 1/2012 |
| JP | 2017120672 A | 7/2017 |
| WO | 03010803 A1 | 2/2003 |

*Primary Examiner* — Ali Bayat
(74) *Attorney, Agent, or Firm* — Rossi, Kimms & McDowell LLP

(57) ABSTRACT

This invention makes it possible to properly detect a detection object region in an image. For this purpose, an image processing apparatus according to this invention includes an image input unit configured to input an object image and a reference image different in pixel value component type from the object image, a detection unit configured to detect a detection object candidate region from the object image, an extraction unit configured to extract at least one feature amount from the detection object candidate region by using at least the reference image, and a selection unit configured to select the detection object candidate region based on the feature amount.

20 Claims, 8 Drawing Sheets

(51) Int. Cl.
*G06T 7/50* (2017.01)
*G01N 21/89* (2006.01)
*G01N 21/88* (2006.01)
*G06K 9/00* (2006.01)
*G06K 9/34* (2006.01)
*G06T 5/00* (2006.01)

(52) U.S. Cl.
CPC ......... *G06K 9/00228* (2013.01); *G06K 9/346* (2013.01); *G06T 5/002* (2013.01); *G06T 7/50* (2017.01); *G06T 7/74* (2017.01); *G01N 2021/8887* (2013.01)

(58) Field of Classification Search
USPC ....................................................... 382/190
See application file for complete search history.

(56) References Cited

U.S. PATENT DOCUMENTS

| | | | | |
|---|---|---|---|---|
| 2009/0316168 | A1* | 12/2009 | Enjuji | G06K 9/00234 358/1.9 |
| 2009/0324091 | A1* | 12/2009 | Hori | H04N 1/00132 382/199 |
| 2010/0027072 | A1* | 2/2010 | Enjuji | G06T 5/40 358/3.01 |
| 2010/0054589 | A1* | 3/2010 | Ishii | H04N 1/6027 382/167 |
| 2013/0304399 | A1* | 11/2013 | Chen | G06T 7/12 702/40 |
| 2015/0214000 | A1* | 7/2015 | Hirai | H01J 37/222 382/141 |
| 2017/0108443 | A1* | 4/2017 | Kurihara | G01N 21/8806 |
| 2017/0115230 | A1* | 4/2017 | Kurihara | G01N 21/8851 |

* cited by examiner

IMAGE PROCESSING APPARATUS, METHOD, AND NON-TRANSITORY COMPUTER-READABLE STORAGE MEDIUM

BACKGROUND OF THE INVENTION

Field of the Invention

The present invention relates to an image processing apparatus, a method, and a non-transitory computer-readable storage medium.

Description of the Related Art

When inspecting articles by using images, it is generally desirable to enhance defective regions. This makes it necessary to acquire images with high sensitivity. Note, however, that excessively increasing the sensitivity will increase a noise component, resulting in difficulty in discriminating a defective region and a region on which noise is superimposed (to be referred to as a noise region hereinafter) in an image. This necessitates a technique of leaving only defective region candidates by performing mask processing for classifying an image into defective regions and noise regions.

For example, as a method of generating images by image capturing with high sensitivity, a phase shift method is available. The phase shift method is a method of performing measurement by projection while performing phase shifting using a stripe pattern obtained by modulating projection intensities into a sine wave. This method can obtain measurement values at all pixels, and hence can perform accurate measurement from a relatively small number of images. For this reason, the method allows easy adjustment of a measurement range and can be easily applied to an image capturing system. The phase shift method generally generates an amplitude image indicating intensities and a phase difference image representing frequency components. It is, therefore, conceivable to discriminate defective regions and noise components from each other by using two different images, namely an amplitude image and a phase difference image.

A literature (Japanese Patent Laid-Open No. 2017-120672) discloses a method of generating a learning image by detecting a candidate region from a depth image, calculating an observation data distribution representing a correspondence relationship from a region of a luminance image which corresponds to the candidate region, and calculating an error with respect to model data. The method disclosed in this literature is, however, a simple image generation method, and is not configured to narrow down and determine whether a given region is a normal region or a detection object region in learning data.

A literature (Japanese Patent Laid-Open No. 2005-102862) discloses a method of detecting a candidate region from a depth image and determining whether an abnormal shadow candidate detected from two types of mammograph images with different threshold parameters is positive based on the feature amount of the abnormal shadow candidate. However, this processing is an abnormality detection method and is not used as image correction processing or preprocessing to be used before recognition processing.

A literature (Japanese Patent No. 4861605) discloses an image correction method of performing region detection from a luminance image by pattern matching, calculating backlight and direct light levels from the feature amounts of background and foreground regions with respect to the detected region, changing image correction parameters based on the backlight and direct light levels, and making setting to inhibit image correction depending on a region. In this technique, an image correction method is decided based on only a luminance image, but an image transformation method is not decided by using different types of images, for example, a luminance image and a depth image.

SUMMARY OF THE INVENTION

The present invention has been made in consideration of the above points, and provides a technique of properly detecting a detection object region in an image.

According to a first aspect of the invention, there is provided an image processing apparatus comprising: an image input unit configured to input an object image and a reference image different in pixel value component type from the object image; a detection unit configured to detect a detection object candidate region from the object image; an extraction unit configured to extract at least one feature amount from the detection object candidate region by using at least the reference image; and a selection unit configured to select the detection object candidate region based on the feature amount.

According to a second aspect of the invention, there is provided an image processing method comprising: inputting an object image and a reference image different in pixel value component type from the object image; detecting a detection object candidate region from the object image; extracting at least one feature amount from the detection object candidate region by using at least the reference image; and selecting the detection object candidate region based on the feature amount.

According to a third second aspect of the invention, there is provided an non-transitory computer-readable storage medium storing a program which, when read and executed by a computer, causes the computer to perform the steps of an image processing method, the method comprising: inputting an object image and a reference image different in pixel value component type from the object image; detecting a detection object candidate region from the object image; extracting at least one feature amount from the detection object candidate region by using at least the reference image; and selecting the detection object candidate region based on the feature amount.

According to the present invention, it is possible to properly detect a detection object region in an image.

Further features of the present invention will become apparent from the following description of exemplary embodiments (with reference to the attached drawings).

DESCRIPTION OF THE EMBODIMENTS

The embodiments of the present invention will be described in detail below with reference to the accompanying drawings.

First Embodiment

This embodiment will exemplify the task of inspecting inspection objects sequentially transferred onto an inspection line based on images obtained by capturing the inspection objects and displaying inspection results.

Figure 1:
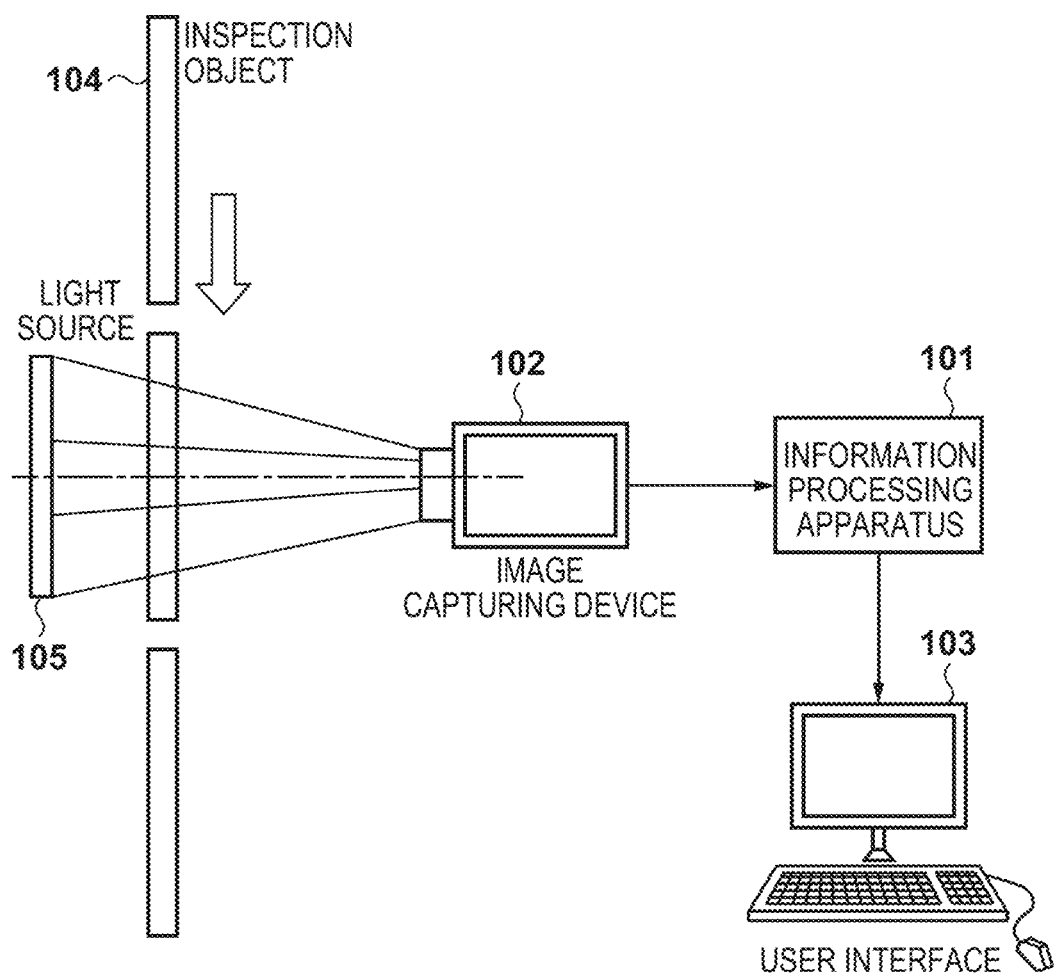
FIG. 1 is a view showing the system arrangement of an information processing system according to the first embodiment.

FIG. 1 shows the system arrangement of an information processing system according to this embodiment. This system includes an information processing apparatus 101 that inspects inspection objects and an image capturing device 102 that captures images of inspection objects. A user interface 103 is a device that has a data display function of displaying inspection results obtained by the information processing apparatus 101 and information prompting the user to perform an input operation and is used by the user to input data. The user interface 103 includes a monitor, a keyboard, a mouse, and a touch panel. The user interface 103 displays images and the like indicating inspection results transmitted from the information processing apparatus 101, and inputs determination results and the like obtained by the user with respect to inspection results.

An inspection object 104 is an inspection object in this embodiment. A light source 105 irradiates the inspection object 104 with light. The image capturing device 102 captures an image of the inspection object 104 irradiated with light and supplies the captured image as image data to the information processing apparatus 101.

Figure 2:
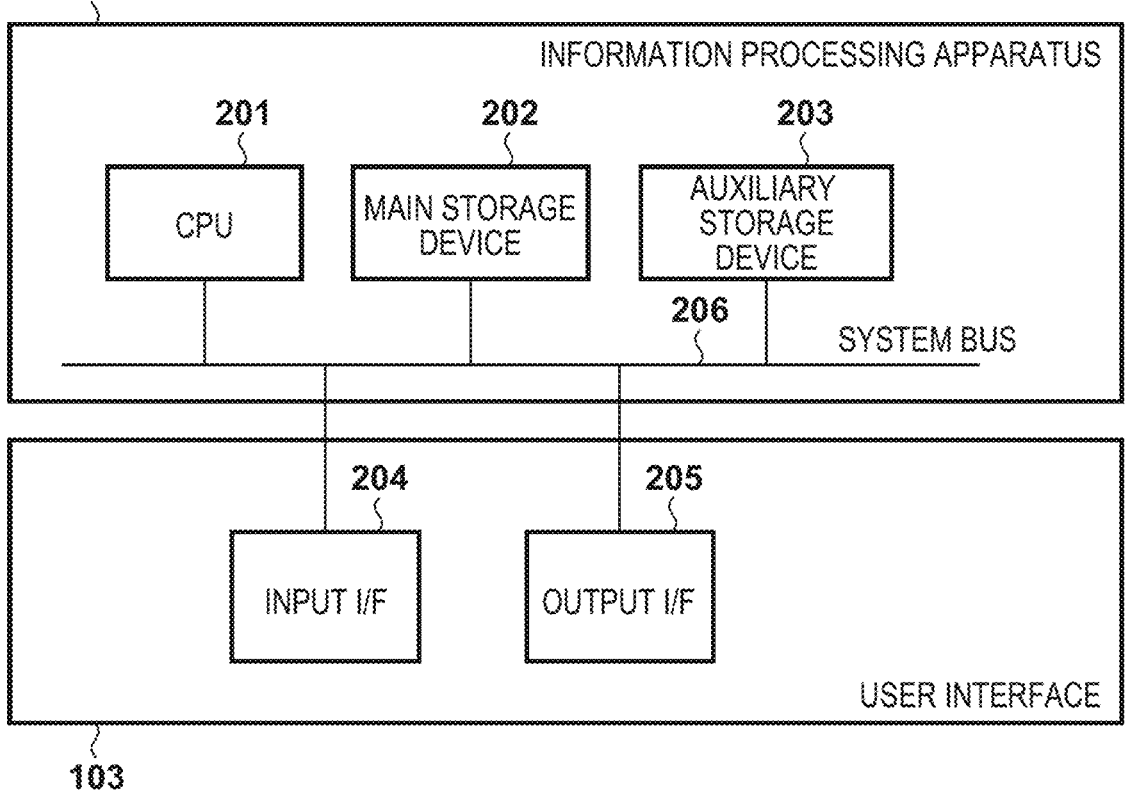
FIG. 2 is a block diagram showing the hardware arrangements of an information processing apparatus and a user interface according to the first embodiment.

FIG. 2 shows an example of the hardware arrangements of the information processing apparatus 101 and the user interface 103 according to this embodiment.

The information processing apparatus 101 includes a CPU 201, a main storage device 202, and an auxiliary storage device 203. The user interface 103 includes an input I/F 204 and an output I/F 205. The CPU 201, the main storage device 202, the auxiliary storage device 203, the input I/F 204, and the output I/F 205 are connected to each other via a system bus 206.

The CPU 201 is a central processing unit that controls processing performed by the information processing apparatus 101. The main storage device 202 is a storage device that functions as a work area for the CPU 201 and stores programs and the like. The main storage device 202 includes a ROM and a RAM. The auxiliary storage device 203 is a storage device that stores data to be described later, various types of set values, data such as various thresholds, and various types of programs, and is typically an HDD.

The input IX 204 is an interface that is used when the user interface 103 receives an input. Note that the CPU 201 also receives captured images from the image capturing device 102 via the input I/F 204.

The output I/F 205 is an interface used to output data to an external apparatus. The CPU 201 outputs the information of a detection result to the user interface 103 via the output I/F 205 to display the information on a monitor (not shown). The CPU 201 implements the functions of the information processing apparatus 101 and the user interface 103 in FIG. 2 (to be described later) by executing processing based on programs stored in the main storage device 202 or the auxiliary storage device 203 and processing in the flowcharts of FIGS. 4, 5, 7, 10, and 12 (to be described later).

Figure 3:
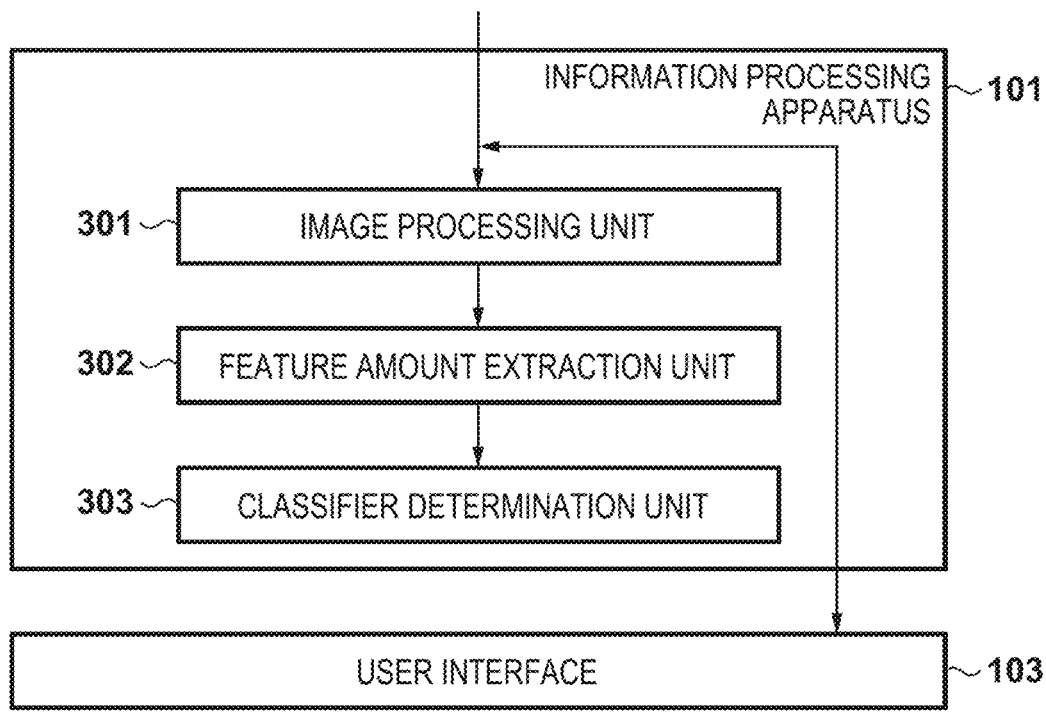
FIG. 3 is a block diagram showing the functional arrangements of the information processing apparatus and the user interface according to the first embodiment.

FIG. 3 shows an example of the functional arrangements of the information processing apparatus 101 and the user interface 103. The information processing apparatus 101 includes an image processing unit 301, a feature amount extraction unit 302, and classifier determination unit 303. The CPU 201 of the information processing apparatus 101 implements these units by executing inspection programs stored in the main storage device 202 or the auxiliary storage device 203.

The image processing unit 301 inputs the image data of the inspection object 104, which is obtained by image capturing by the image capturing device 102, and performs processing for removing a noise component from an image close to an inspection object region by image processing. Note that when moving image data is input from the image capturing device 102, the image processing unit 301 acquires a still image (frame) at the time point when the inspection object 104 reaches a predetermined position.

The feature amount extraction unit 302 extracts a feature amount from an inspection object region of an image from which a noise component is removed by the image processing unit 301. A feature amount used in this embodiment will be described later with reference to step S403 in FIG. 4. An inspection object is a region in an image captured by the image capturing device 102, and includes the inspection object 104.

The classifier determination unit 303 generates a normal model classifier based on the feature amount extracted by the feature amount extraction unit 302, and calculates the recognition score of determination object data by using the generated normal model classifier and the feature amount obtained from the determination object data. In this case, the normal model classifier is configured to define a normal range by using only the known inspection object 104 as "normal". This is a technique of discriminating normal data and other abnormal data from each other by determining whether given data falls within the normal range.

Figure 4:
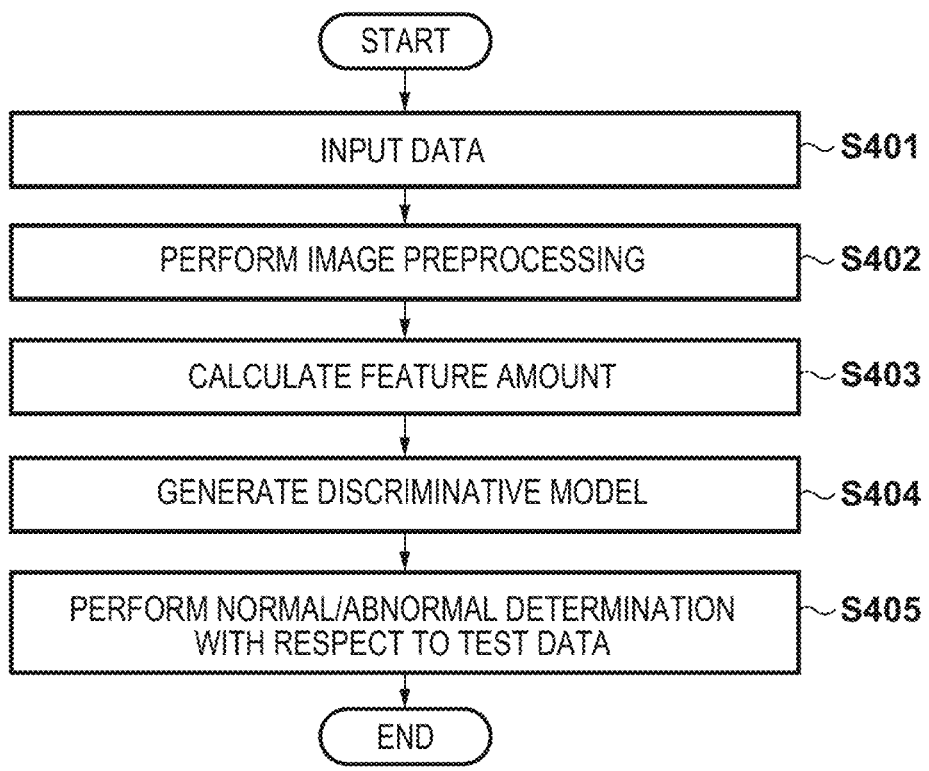
FIG. 4 is a flowchart showing a processing procedure performed by an image processing unit and the user interface according to the first embodiment.

The details of processing performed by the image processing unit 301, the feature amount extraction unit 302, and the classifier determination unit 303 will be described below with reference to the flowchart of FIG. 4.

Step S401: Image Input

In step S401, the image processing unit 301 acquires the image data of the inspection object 104 captured by the image capturing device 102. The image processing unit 301 according to this embodiment acquires an amplitude image (object image) and a phase difference image (reference image) captured by using the phase shift method. The image processing unit 301 according to the embodiment acquires two types of images having different characteristics, more specifically, two types of images different in pixel value component. In addition, the image processing unit 301 may temporarily save the amplitude image and the phase difference image from the image capturing device 102 in the auxiliary storage device 203, and sequentially acquire the image data of the respective images from the auxiliary storage device 203. In this case, when an inspection object region is a portion on an image, the image processing unit 301 acquires only the inspection object region in the image as an evaluation object.

Step S402: Image Preprocessing

In step S402, the image processing unit 301 performs image preprocessing with respect to the inspection object region of the image data of the amplitude image (object image) of the inspection object 104 acquired in step S401.

In image preprocessing, first of all, the image processing unit 301 binarizes a target pixel in the amplitude image based on the luminances of neighboring pixels, and performs labeling processing based on the binarization result. The image processing unit 301 then performs classification between a defect candidate region and a noise component based on the values of standard deviation components of regions in the phase difference image which correspond to the respective labeled regions. The image processing unit 301 then performs processing for leaving the defect candidate region as a defective region without performing any masking processing, and also performs processing for erasing the noise component region as a noise component upon performing masking processing. This processing will be described in detail later with reference to the flowchart of FIG. 5.

Step S403: Feature Amount Calculation

In step S403, the feature amount extraction unit 302 extracts a feature amount from the inspection object region of the image data of the object image after masking processing acquired in step S402.

When a plurality of feature amounts are to be used, the feature amount extraction unit 302 generates, for example, hierarchical transformed images by applying Haar Wavelet transformation to the inspection object region of the object image. Haar Wavelet transformation is processing for performing frequency transformation of image data while holding position information. The feature amount extraction unit 302 according to this embodiment uses Haar Wavelet transformation as processing for calculating the feature amount of the image data acquired in step S402.

The feature amount extraction unit 302 calculates, as feature amounts, the maximum values, average values, and standard deviations of the pixel values of a total of N types (N layers) of images generated from one object image by using Haar Wavelet transformation processing. That is, the feature amount extraction unit 302 generates a total of N types of images from one object image, and extracts three types of statistical feature amounts from each of the generated images. As a result, the feature amount extraction unit 302 extracts a total of 3N feature amounts from one object image.

As described above, with the processing in step S403, the feature amount extraction unit 302 can extract a plurality of feature amounts from the object image. Note that the feature amount of the object image may be calculated and stored in the auxiliary storage device 203 in advance.

Step S404: Generation of Discriminative Model

In step S404, the classifier determination unit 303 generates or updates a discriminative model (to be described later) by using the feature amounts calculated in step S403.

This embodiment uses a projection distance method as one of the partial space methods to generate a discriminative model. In short, a projection distance is the shortest distance between a feature vector in a feature space defined by the respective feature amounts as axes and a hyperplane (principal plane) having a direction in which the pattern distribution dispersion is maximum. In this case, the generated discriminative model is used to perform normal/abnormal discrimination.

Step S405: Normal/Abnormal Determination with Respect to Test Data

In step S405, the classifier determination unit 303 performs normal/abnormal determination with respect to object image data by using the discriminative model generated in step S404. More specifically, the classifier determination unit 303 extracts feature amounts from the object image data and performs normal/abnormal determination by using the discriminative model generated or updated in step S403. In this case, the classifier determination unit 303 calculates a projection distance with respect to the object image data and performs threshold processing, thus performing normal/abnormal determination.

Figure 5:
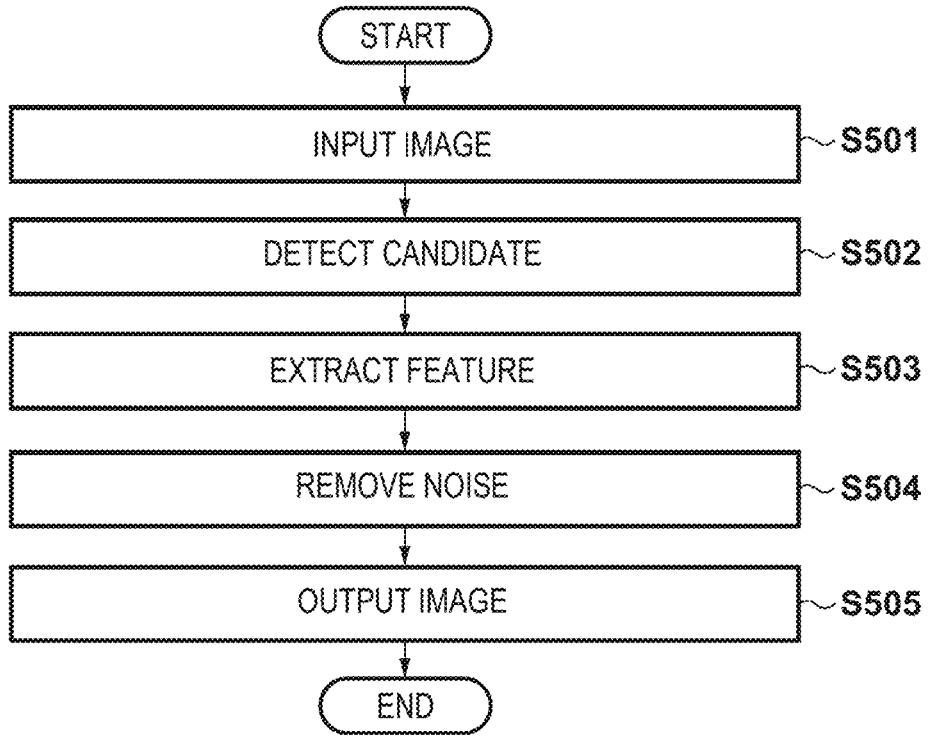
FIG. 5 is a flowchart showing an example of information processing performed by the image processing unit and the user interface according to the first embodiment.

FIG. 5 is a flowchart showing an example of information processing performed by the image processing unit 301 and the user interface 103. Processing (step S402 in FIG. 4) performed by the image processing unit 301 will be described with reference to FIG. 5.

Step S501: Image Input

In step S501, the image processing unit 301 acquires the image data of a determination object captured by the image capturing device 102. In this embodiment, the image processing unit 301 acquires an amplitude image and a phase difference image captured by the phase shift method. In this case, when an inspection object region is a portion on an image, only an inspection object region in the image is acquired as an evaluation object.

Step S502: Candidate Detection

In step S502, the image processing unit 301 performs binarization processing with respect to an inspection object region of the amplitude image data (object image) acquired in step S501.

The image processing unit 301 binarizes an object pixel to be binarized with reference to the average luminance (threshold) of a neighboring pixel group of the object image. More specifically, the image processing unit 301 calculates the average luminance of (h×h−1) pixels excluding the object pixel in an h×h pixel region centered on the object pixel. If the value obtained by multiplying the calculated average luminance by a predetermined value p is less than the luminance value of the object pixel, the image processing unit 301 sets the value "1" as a binarization result with respect to the object pixel. In contrast to this, if the value obtained by multiplying the average luminance by the predetermined value p is more than the luminance value of the object pixel, the image processing unit 301 sets the value "0" as a binarization result with respect to the object pixel. In this manner, the image processing unit 301 obtains a binarized image with each pixel value being set to the value "1" or "0" by processing every pixel of the inspection object region as the above object pixel. Note that when an object pixel is located at an end or the like of an image, some of h×h pixels are located outside the image. The image processing unit 301 excludes the pixels located outside the image from object pixels from which an average luminance is to be obtained, and sets the object pixel to the value "1" or "0" by performing threshold processing with respect to the object pixel by obtaining the average value of the remaining pixels. Although the predetermined value p is set in advance according to the above description, the image processing unit 301 may calculate the luminance values of a candidate region and a region other than the candidate region, decide the parameter p in consideration of the degree of separation, and set the value of a mask for the candidate region. In addition, although it is assumed that "h" that defines the spread of a neighboring pixel group is set in advance, the user may set it as needed.

The image processing unit 301 performs labeling processing with respect to the binarized image obtained in the above manner. Labeling processing is processing for assigning one label to a region where the pixel values "1s" are continuous in the binarized image. In this case, "continuous" may be defined as being four concatenated 1s or eight concatenated 1s. "Four concatenated 1s" corresponds to a case in which when adjacent pixels of a binarized target pixel of "1" in the vertical or horizontal direction are "1s", the same label is assigned to them. "Eight concatenated is" corresponds to a case in which when adjacent pixels in the oblique directions (four directions) in addition to the vertical and horizontal directions are "is", the same label is assigned to them. This embodiment performs labeling processing with respect to a binarized image by using "four concatenated 1s" to detect a region. However, the embodiment may use "eight concatenated 1s". Note that a region as a cluster in which pixel values "1 s" are continuous in a binarized image will be referred to as a "cluster region" hereinafter.

Step S503: Feature Extraction

In step S503, the image processing unit 301 calculates feature amounts such as the areas and lengths of the respective cluster regions obtained by labeling processing in step S503. Assume that "area" is the number of pixel values "1s" in a cluster region, and "length" is the Euclidean distance between the two farthest pixels of the pixel values "1s" in the cluster region.

Step S504: Noise Removal

In step S504, the image processing unit 301 decides whether to perform mask processing by using the feature amounts of the respective cluster regions obtained in step S504.

When using feature amounts inside regions such as areas and lengths, the image processing unit 301 can determine that a given region is a defective region if the area or the length exceeds a threshold set for a corresponding feature amount. Accordingly, if the area or length of a given region exceeds a threshold set for a corresponding feature amount, the image processing unit 301 sets the value "0" indicating the inhibition of mask processing to the object cluster region. In addition, if the area or length of a given region is less than the corresponding threshold, the region can be either a noise region or a defective region. Accordingly, if the area or length of a given region is less than the corresponding threshold, the image processing unit 301 tentatively sets "1" indicating a mask candidate for the object cluster region.

Note that when using an inter-region distance as a feature amount, the image processing unit 301 obtains the shortest distance between the nearest regions as clusters. If the obtained distance is less than a predetermined distance, the image processing unit 301 sets the value "0" indicating the inhibition of mask processing for each region. In contrast to this, if the obtained shortest distance between the clusters is equal to or more than the predetermined distance, the image processing unit 301 sets the value "1" for performing mask processing for each region.

Subsequently, for each cluster region set as a mask candidate, the image processing unit 301 obtains the standard deviation of the pixel values of a corresponding region in the phase difference image. The image processing unit 301 then expresses each cluster region set as a mask candidate by the vectors of two components, namely {area, standard deviation}, and plots the feature amounts in an area-standard deviation coordinate space.

Figure 6:
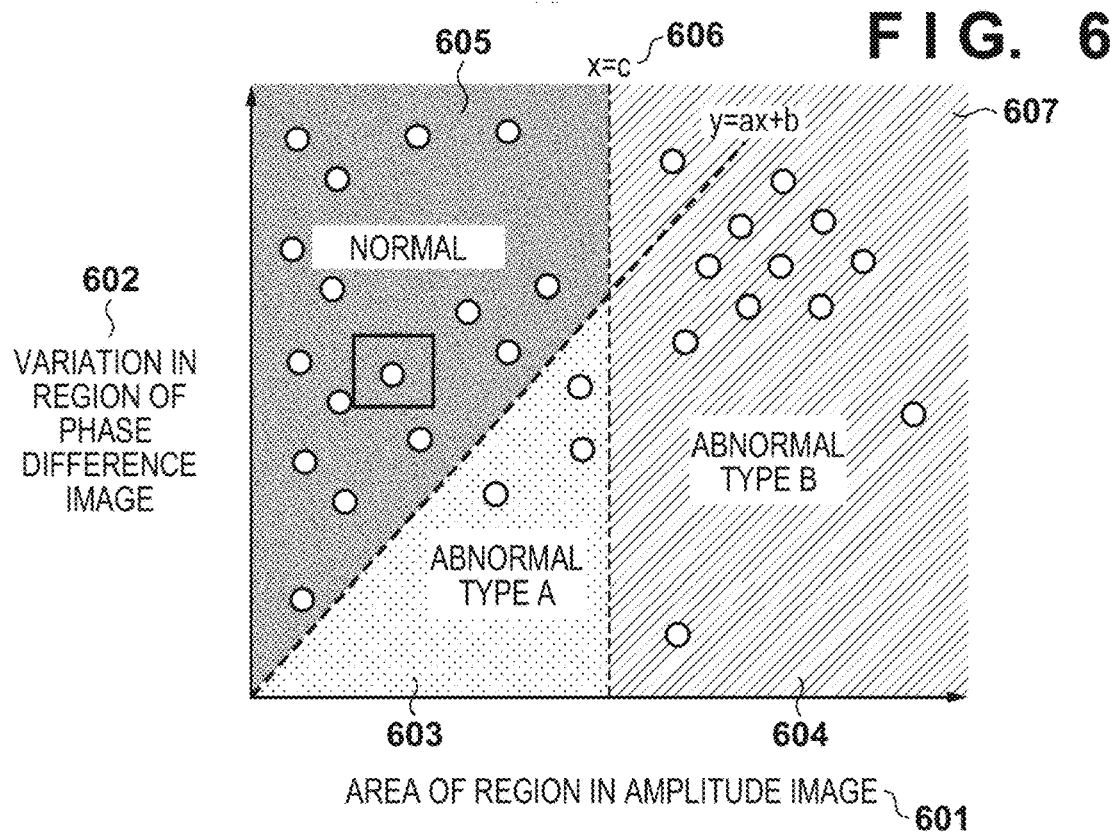
FIG. 6 is a view showing a cluster region classification method according to the first embodiment.
Figure 7:
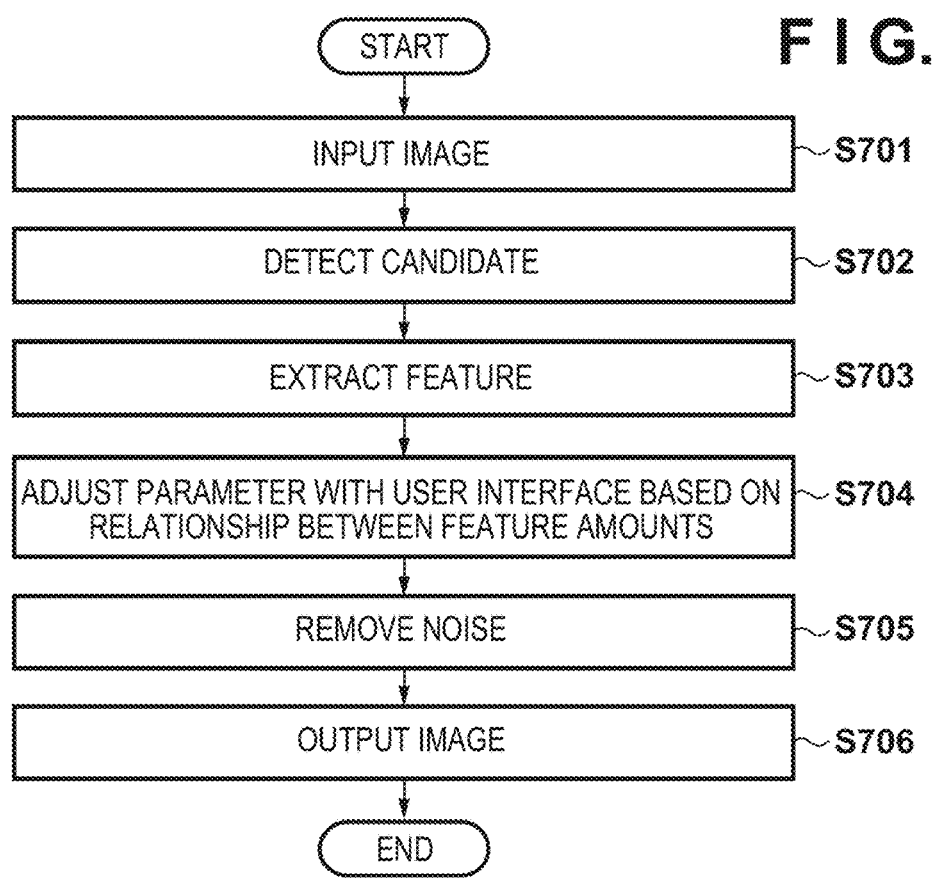
FIG. 7 is a flowchart showing a processing procedure performed by an image processing unit and a user interface according to the second embodiment.

FIG. 6 shows this plot example. Referring to FIG. 6, feature amounts (areas) 601 of the regions of the amplitude image are plotted along the X-axis, and feature amounts (standard deviations) 602 of the regions of the phase difference image are plotted along the Y-axis. The feature amounts of the respective cluster regions are plotted in the coordinate space defined by the X- and Y-axes, and the coordinate space is divided into three regions. For example, the coordinate space is divided into a region 603 indicating abnormal type A, a region 604 indicating abnormal type B, and a region 605 indicating "normal".

A boundary 606 is expressed by x=c, and the above regions are divided into the region 603 indicating abnormal type A and the region 604 indicating abnormal type B. In this case, a parameter c is a parameter for dividing the above regions into the region 603 indicating abnormal type A and the region 604 indicating abnormal type B. The parameter c is decided by using the results obtained by checking the data in the respective regions.

A boundary 607 is represented by y=ax+b, and the above regions are divided into the region 605 indicating "normal" and the region 603 indicating abnormal type A. In this case, a parameter $\underline{a}$ (slope) and a parameter b (intercept) are parameters for dividing the above regions into the region 605 indicating "normal" and the region 603 indicating abnormal type A. The parameters $\underline{a}$ and b are decided by using the results obtained by checking the data in the regions.

The image processing unit 301 regards the region 605 (satisfying x≤c and y≥ax+b) of the three regions plotted as shown in FIG. 6 as noise. In other words, the regions 603 and 604 are regarded as defective regions. Accordingly, the image processing unit 301 sets "0" indicating the inhibition of masking for cluster regions, of the cluster regions for which "1" indicating a mask candidate is tentatively set, which belong to the regions 603 and 604.

Note that in this embodiment, a standard deviation is obtained as a feature amount from a candidate region of a phase difference image as a reference image. However, the present invention is not limited to this. For example, it is possible to use other statistical values such as an average value or multidimensional feature amounts such as a histogram.

Having undergone the above processing, the image processing unit 301 selects (generates) a mask for discriminating the respective cluster regions into a defective region (unmasked region) and a noise region (masked region).

Step S505: Image Output

In step S505, the image processing unit 301 performs classification between a defect candidate region and a noise component by performing mask processing using the mask generated in step S504, and generates an amplitude image upon canceling the noise component. In this case, in a region in which the value "0" is set by masking, the pixel values of the object image are not changed. In contrast to this, a region in which the value "1" is set by masking (a cluster region which has an area or distance equal to or less than the threshold and is determined as "normal" in FIG. 6) is complemented by being filled with the neighboring luminances (for example, the average luminance) of the corresponding region of the object image. With this operation, the image processing unit 301 can perform classification between a detection object candidate region and a noise component region, and generate an object image suitable for normal/abnormal determination, from which the noise component has been erased. Although this embodiment is based on the assumption that a mask is used, filling processing with neighboring luminances may be performed with respect to a noise component without using any mask.

Note that in this embodiment, a standard deviation is obtained as a feature amount from a candidate region of a phase difference image as a reference image. However, the present invention is not limited to this. For example, it is possible to use other statistical values such as an average value or multidimensional feature amounts such as a histogram.

As described above, in this embodiment, a detection object candidate region is calculated from amplitude image data, and a detection object candidate region is detected based on the area or length as a feature amount of the detection object candidate region. It is possible to accurately detect a detection region by using a reference image having a characteristic different from that of the object image and deciding a detection candidate region from a detection object candidate region based on the feature amount of a region of the reference image which corresponds to the detection object candidate region of the object image.

Second Embodiment

The information processing system according to the first embodiment described above performs labeling processing for each region upon performing binarization processing of an image by using neighboring luminances, and then performs classification between a defect candidate region and a noise component based on the values of standard deviation components of different types of images. The first embodiment performs processing for leaving a defect candidate region as a defective region without performing any masking processing, and performs processing for erasing a noise component region as a noise component by performing masking processing for the region.

In contrast to this, an information processing system according to the second embodiment decides a threshold for binarizing an image by using a user interface 103, and decides a parameter for performing classification between a defect candidate region and a noise component. The mechanism of such decision making will be described below.

Step S702: Candidate Detection

In step S702, an image processing unit 301 performs binarization processing by using an initial threshold with respect to an inspection object region of the amplitude image data acquired in step S701.

Binarization processing is processing for performing binarization with reference to the neighboring average luminance of an object pixel. More specifically, the image processing unit 301 specifies an H×H region centered on an object pixel, and calculates the average luminance of the detected (H×H−1) pixels excluding the object pixel.

If the value obtained by multiplying the calculated average luminance by an initial value p is less than the pixel value of the object pixel, the value "1" as the binarization result is set for the object pixel. In other words, if the pixel value of the object pixel is equal to or more than the value obtained by multiplying the average value by the initial value p, the value "1" as the binarization result is set for the object pixel.

In contrast, if the value obtained by multiplying the calculated average luminance by an initial value p is equal to or more than the pixel value of the object pixel, the value "0" as the binarization result is set for the object pixel. In other words, if the pixel value of the object pixel is less than the value obtained by multiplying the average value by the initial value p, the value "0" as the binarization result is set for the object pixel.

Step S704: Check on Parameter Via User Interface Based on Relationship Between Feature Amounts In step S704, the image processing unit 301 prompts the user to adjust the binarization parameter p via the user interface 103. In this case, a predetermined value to be multiplied by an average luminance is set as p, and the user adjusts the parameter p by using the user interface 103 (a sider bar in this embodiment).

Figure 8:
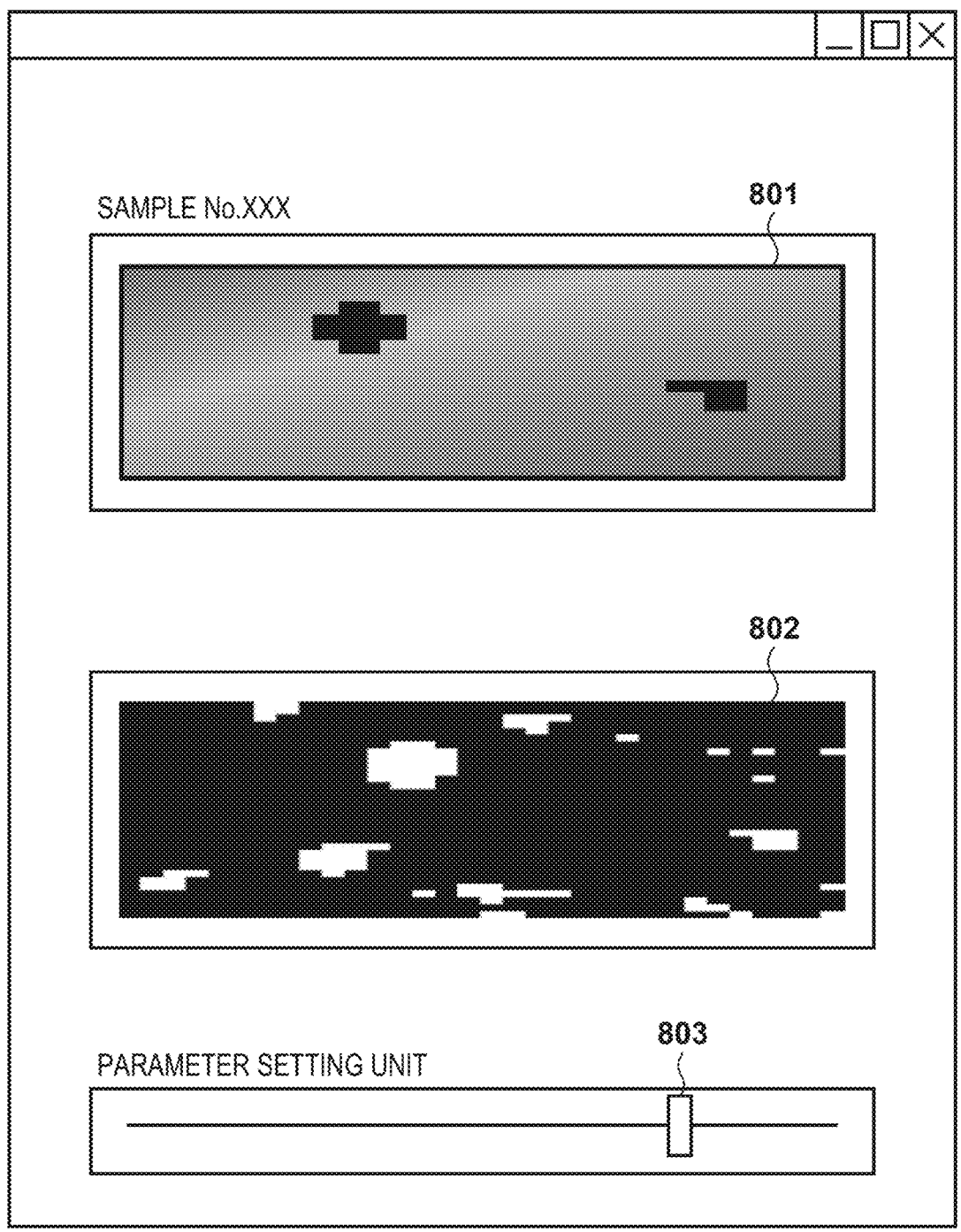
FIG. 8 is a view showing a display screen concerning parameter setting according to the second embodiment.

FIG. 8 shows a display screen for deciding the parameter p displayed on the user interface 103.

Referring to FIG. 8, reference numeral 801 denotes an amplitude image, which is displayed to explicitly indicate the positions of defective regions in the amplitude image. Reference numeral 802 denotes a binarized image obtained by binarization processing. As in step S502, an H×H region centered on an object pixel is detected, and the average luminance of the detected H×H region excluding the object pixel is calculated. If the value obtained by multiplying the calculated average luminance by the value p set by using the threshold adjustment unit is less than the pixel value of the object pixel, the value "1" is set for the object pixel. In contrast to this, if the value obtained by multiplying the calculated average luminance by the value p set by using the threshold adjustment unit is more than the pixel value of the object pixel, the value "0" is set for the object pixel.

Reference numeral 803 denotes a threshold adjustment unit. A threshold for generating the binarized image 802 is decided based on the value p adjusted and set by the threshold adjustment unit 803, and a binarized image is generated. The user can change the value p by issuing an instruction to slide the knob of the threshold adjustment unit 803 to the right and left. The binarized image 802 changes in accordance with the value p at the knob position. Note that in the initial screen in FIG. 8, the knob of the threshold adjustment unit 803 is positioned in the middle, at which the value p is "1.0".

The above description concerns how to set a threshold for binarization processing according to the second embodiment.

Figure 9:
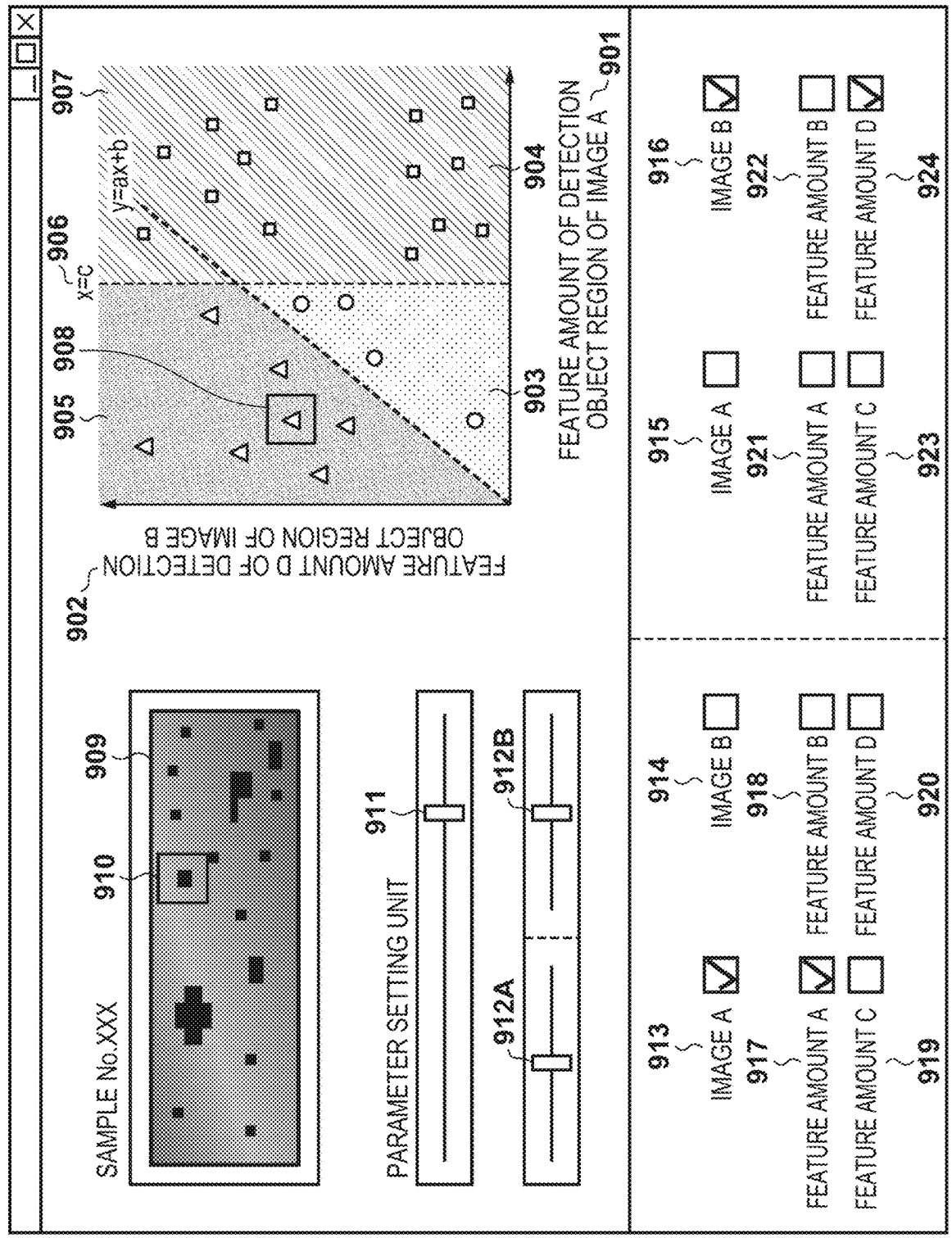
FIG. 9 is a view showing another display screen concerning parameter setting according to the second embodiment.

FIG. 9 shows an example of a display screen which is displayed on the user interface 103 and is used to decide a parameter c indicated by a boundary 606 (x=c) in FIG. 6 and parameters a and b for a boundary 607 (y=ax+b).

A feature amount (area) 901 of a region of an amplitude image represents the feature amount (area) for each region of a mask image and is expressed by the X-axis. In addition, a feature amount (standard deviation) 902 of a region of a phase difference image represents the standard deviation of a region of the phase difference image which corresponds to each region of the mask image and is expressed by the Y-axis. The feature amounts of the respective regions are plotted and divided into three regions. For example, the feature amounts of the respective regions are divided into a region 903 indicating abnormal type A, a region 904 indicating abnormal type B, and a region 905 indicating "normal".

A boundary 906 is expressed by x=c, which divides the region into the region 903 indicating abnormal type A and the region 904 indicating abnormal type B. The parameter c in this case is a parameter for dividing the region into the region 903 indicating abnormal type A and the region 904 indicating abnormal type B. The parameter c is decided by using the result obtained by checking the data in the region.

A boundary 907 is represented by y=ax+b, which divides the region into the region 905 indicating "normal" and the region 903 indicating abnormal type A. The parameters $\underline{a}$ (slope) and b (intercept) are parameters for dividing the region into the region 905 indicating "normal" and the region 903 indicating abnormal type A. The parameters $\underline{a}$ and b are decided by using the results obtained by checking the data in the regions.

An image 909 is an actual image. The respective regions of this image are plotted along the X-axis 901 and the Y-axis 902. A cursor 908 is a selection tool for selecting a region. In this case, the selected region corresponds to a region 910 of the image 909.

A parameter setting unit 911 is a tool for setting the parameter c for the boundary 906. Adjusting the parameter setting unit 911 makes it possible to check whether it is possible to separate the region 903 indicating abnormal type A from the region 904 indicating abnormal type B.

Parameter setting units 912A and 912B are tools for setting the parameters $\underline{a}$ and b for the boundary 907. Adjusting the parameter setting units 912A and 912B makes it possible to check whether it is possible to separate the region 905 indicating "normal" from the region 903 indicating abnormal type A.

Image check boxes 913 and 914 are check boxes indicating candidates for selecting images. Feature amount check boxes 917, 918, 919, and 920 are check boxes indicating candidates for selecting feature amounts. Because the image check box 913 and the feature amount check box 917 are checked, the feature amount 901 indicating the X-axis indicates feature amount A of image A.

Likewise, image check boxes 915 and 916 are check boxes indicating candidates for selecting images. Feature amount check boxes 921, 922, 923, and 924 are check boxes indicating candidates for selecting feature amounts. Because the image check box 916 and the feature amount check box 924 are checked, the feature amount 902 indicating the Y-axis indicates feature amount D of image B.

In this case, two feature amounts are used to check whether a given region is defect type A or defect type B. However, the present invention incorporates a case in which three or more feature amounts are used. The case in which three or more feature amounts are used can be coped with increasing the numbers of image check boxes and feature amount check boxes and performing a display operation with three or more evaluation axes for feature amounts.

As described above, when detecting a detection object candidate region from image data, the second embodiment uses the user interface 103 to prompt the user to determine whether it is possible to detect a detection object candidate region, and sets parameters. In addition, the embodiment uses the user interface 103 to set parameters for classification between a detection object candidate region and a noise component, thereby performing classification between a detection object candidate region and a noise component. This makes it possible to perform preprocessing for removing noise components while leaving only a detection object candidate region, thereby accurately detecting a detection object region.

Third Embodiment

The information processing system according to the first embodiment performs binarization processing of an amplitude image based on neighboring luminances and performs labeling processing for each region, thereby obtaining cluster regions. Cluster regions that cannot be determined to be either noise or a defective region are classified into a defect candidate region and a noise component based on the relationship between the areas of the regions and the standard deviation components of a phase difference image. This system then performs processing for leaving the defect candidate region as a defective region without performing any masking processing and performs processing for erasing the noise component region as a noise component by performing masking processing.

In contrast to this, an information processing system according to the third embodiment classifies regions into a noise component region, abnormal type A, and abnormal type B by performing clustering from a feature space defined by the area axis of each region and the standard deviation axis of a phase difference image, and then performs image preprocessing.

Figure 10:
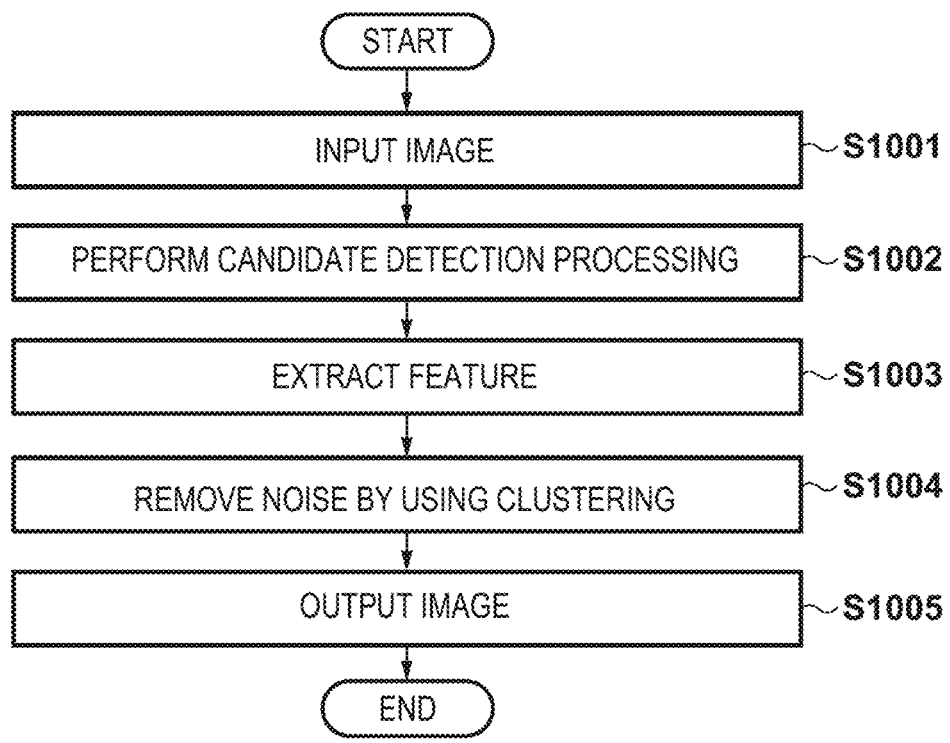
FIG. 10 is a flowchart showing a processing procedure performed by an image processing apparatus and a user interface according to the third embodiment.

Note that because processing in steps S1001, S1002, S1003, and S1005 in FIG. 10 is the same as that in steps S501, S502, S503, and S505 in FIG. 5, a description of the processing will be omitted, and step S1004 will be described. That is, this system does not perform determination concerning a defective region and a noise region based on the area and distance of each cluster region in the first stage of processing.

Step S1004: Mask Generation Using Clustering

In step S1004, an image processing unit 301 determines whether to perform mask processing with respect to cluster regions obtained by labeling processing in step S1003.

More specifically, the image processing unit 301 decides the number of classifications in accordance with the number of abnormal types. For example, if a normal region, abnormal type A, and abnormal type B are known, the image processing unit 301 performs clustering by a shortest distance method so as to obtain three clustering results.

The shortest distance method is a method of concatenating data in ascending order of Euclidean distance upon calculating all the Euclidean distances between the data. When the number of clusters reaches a predetermined number, the concatenation is stopped. This makes it possible to obtain learning data that makes the number of clusters reach the predetermined number.

The image processing unit 301 uses the data obtained in this manner to determine to which data the object region is closest in terms of Euclidean distance. By labeling the closest data, the image processing unit 301 decides whether a newly input region is a normal region, abnormal type A, or abnormal type B. The image processing unit 301 decides a cluster region corresponding to a normal region as a noise region, and decides cluster regions plotted on abnormal types A and B as defective regions.

Although unsupervised clustering has been described above, it is possible to perform supervised clustering based on the assumption that the label of each region is known or semi-supervised learning based on the assumption that the labels of some regions are known.

Figure 11:
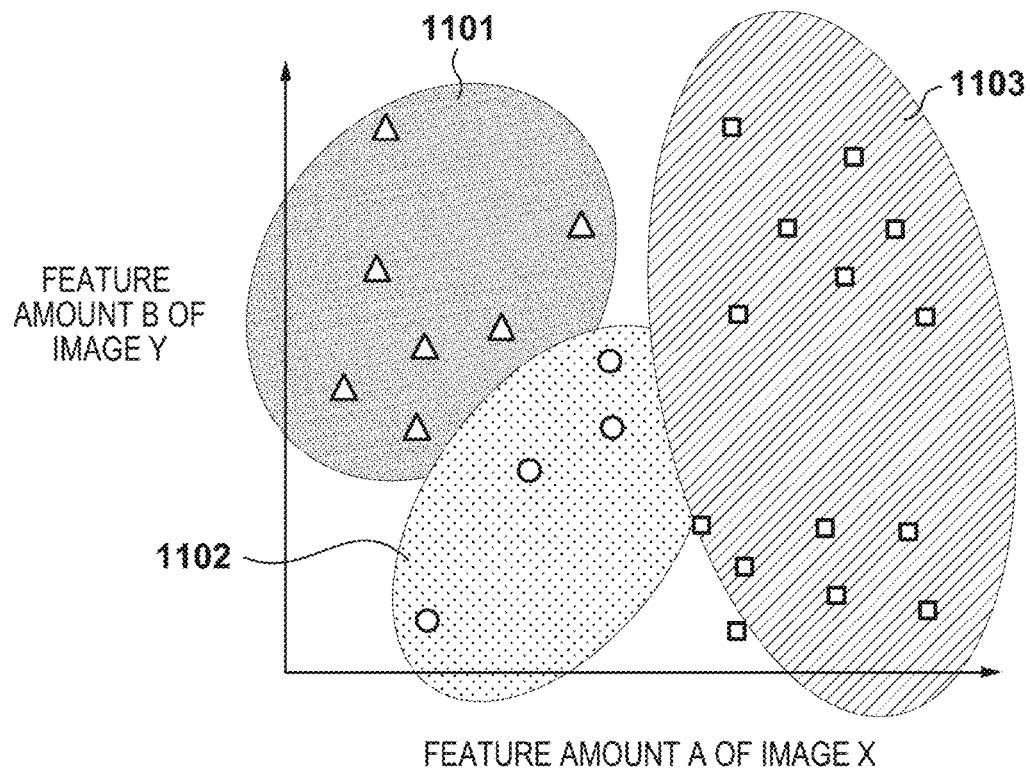
FIG. 11 is a view showing an example of clustering to a coordinate space according to the third embodiment.
Figure 12:
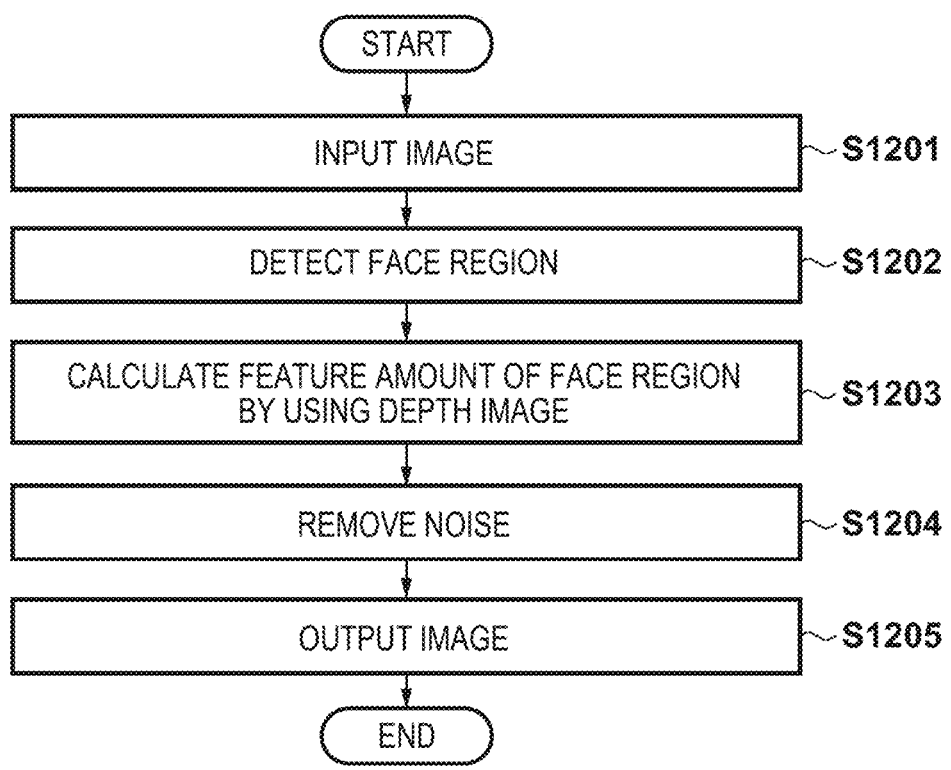
FIG. 12 is a flowchart showing an example of information processing performed by an image processing apparatus and a user interface according to the fourth embodiment.

FIG. 11 shows the result obtained by clustering data in a feature space based on selected feature amounts. The image processing unit 301 clusters data corresponding to regions into three regions between feature amounts based on feature amount A of image X and feature amount B of image Y. Regions 1101, 1102, and 1103 respectively correspond to a region indicating "normal", a region indicating abnormal type A, and a region indicating abnormal type B. The image processing unit 301 decides to which region the object region corresponds by using the clustering result.

The image processing unit 301 determines whether each region labeled with respect to a mask is a noise component region or a detection object region. The image processing unit 301 then inputs "1" to a noise region and inputs "0" to a detection object region, thereby generating a mask.

In this embodiment, the information processing system according to this embodiment classifies regions into a noise component region, abnormal type A, and abnormal type B by clustering based on the relationship between the areas of the respective regions and the standard deviation components of a phase difference image. This system then performs processing for canceling a noise component and filling with neighboring luminances and leaving a detection object region, thus performing preprocessing. Generating an image with a detection object being enhanced by using the image obtained in this manner makes it possible to accurately detect a detection region.

Fourth Embodiment

The information processing system according to the first embodiment performs binarization processing of an amplitude image with neighboring luminances, performs labeling processing for each region, and performs processing for classifying the regions into a defect candidate region and a noise component by using the standard deviation component of the pixel values (phase differences) of a phase difference image, and leaving the defect candidate region as a defective region without performing any masking processing.

In contrast to this, when detecting a face region from image data, an information processing system according to the fourth embodiment performs preprocessing for performing classification between, for example, an actual face region equal to or more than a predetermined area, a face region equal to or less than the predetermined area, and a printed face which is not the actual face, and generating an image excluding regions other than the actual face region equal to or more than the predetermined area, thereby generating an accurate image for learning, evaluation, or grand truth data input. This processing will be described below with reference to FIG. 12.

Step S1201: Image Input

In step S1201, an image processing unit 301 acquires a luminance image (object image) representing the person captured by an image capturing device 102 and a depth image (reference image) concerning the person.

Step S1202: Face Region Detection

In step S1202, the image processing unit 301 detects a face region with respect to an inspection object region of the image data of the object image of the determination object acquired in step S1201.

The image processing unit 301 detects a face region by performing face region detection using template matching with respect to the object image, and detects the contour of the face by flesh color detection. The image processing unit 301 then generates a mask by using the detected contour of the face. The image processing unit 301 generates a mask with "1" being set in the face region and "0" being set in a portion other than the face region by using the contour of the face.

Step S1203: Calculation of Feature Amount of Face Region by Using Depth Image

In step S1203, the image processing unit 301 calculates the standard deviation of distance values in a region of the depth image which corresponds to the face region of the luminance image detected in step S1202.

Step S1204: Noise Removal

In step S1204, the image processing unit 301 calculates the area of the face region of the luminance image detected in step S1203. If the calculated actual area of the face region is less than a predetermined value, "1" is input with respect to the face portion of the mask. Assume that the calculated area of the face region is equal to or more than the predetermined value. In this case, if the standard deviation obtained in step S1203 is equal to or less than the predetermined value, the image processing unit 301 determines that the region is not actual, and inputs "1" with respect to the region. If the area is equal to or more than the predetermined value and the standard deviation is equal to or more than the predetermined value, the image processing unit 301 determines that the region is a non-mask region and inputs "0".

Step S1205: Image Generation

In step S1205, the image processing unit 301 performs classification among an actual face region equal to or more than a predetermined area, a face region equal to or less than the predetermined area, and a face region having a high possibility of being printed matter or the like by performing mask processing using the mask generated in step S1204, and generates an image excluding regions other than the actual face region equal to or more than the predetermined area.

In this case, the image processing unit 301 does not change the pixel value of the person image with respect to the region in which the value "0" is set with the mask, and performs processing for complementing the region in which the value "1" is set with the mask by filling with the neighboring luminances of the corresponding person image region. This makes it possible to perform classification among an actual face region equal to or more than the predetermined area, a face region equal to or less than the predetermined area, and a face region having high possibility of being printed matter or the like, thereby generating an image excluding regions other than the actual face region equal to or more than the predetermined area.

When detecting a face region candidate from image data, this embodiment performs classification among an actual face region equal to or more than the predetermined area, a face region equal to or less than the predetermined area, and a face region having high possibility of being printed matter or the like, thereby generating an image excluding regions other than the actual face region equal to or more than the predetermined area. This makes it possible to accurately detect a face region (detection region).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-185321, filed Sep. 26, 2017, which is hereby incorporated by reference herein in its entirety.

What is claimed is:

1. An image processing apparatus comprising:
   one or more processors, wherein the one or more processors function as:
   an image input unit configured to input an object image and a reference image which corresponds to the object image and is different in pixel value component type from the object image;
   a detection unit configured to detect a detection object candidate region from the object image based on pixel values of the object image;
   an extraction unit configured to extract at least one feature from a region of the reference image corresponding to the detection object candidate region; and
   an identifying unit configured to identify a noise component region from the detection object candidate region based on the feature.

2. The apparatus according to claim 1, wherein the object image is an amplitude image generated by a phase shift method, and the reference image is a phase difference image generated by the phase shift method.

3. The apparatus according to claim 1, wherein the object image is a luminance image, and the reference image is a depth image.

4. The apparatus according to claim 1, wherein the detection unit performs template matching with respect to a luminance image.

5. The apparatus according to claim 1, wherein the detection unit performs flesh color detection with respect to a luminance image.

6. The apparatus according to claim 2, wherein the detection unit performs binarization processing with respect to the amplitude image by using a threshold, and detects an area of a cluster region, in the amplitude image, in which pixels each having a value not less than the threshold are continuous, and a maximum Euclidean distance between two pixels in the cluster region.

7. The apparatus according to claim 6, wherein the one or more processors also function as:
   a classifying unit configured to classify the cluster region into a first cluster region having the area and the Euclidean distance, each being not less than a threshold set for each, and a second cluster region excluding the first cluster region, and further classifies the second cluster region into not less than two cluster regions based on a standard deviation of a corresponding region in the phase difference image.

8. The apparatus according to claim 7, wherein the one or more processors also function as:
   a boundary adjustment unit configured to adjust a boundary for classifying the second cluster region into the not less than two cluster regions in accordance with an instruction from a user.

9. The apparatus according to claim 6, further comprising a threshold adjustment unit configured to adjust the threshold used for the binarization processing in accordance with an instruction from a user.

10. The apparatus according to claim 7, wherein the classifying unit performs classification according to a shortest distance method.

11. The apparatus according to claim 2, wherein the one or more processors also function as:
    a preprocessing unit configured to classify the detection object candidate region into a defect candidate region and the noise component region based on a value of a standard deviation component in a region in the phase difference image, and perform mask processing with respect to the noise component region.

12. The apparatus according to claim 1, wherein the one or more processors also function as:
    a generating unit configured to generate a discriminative model based on the feature; and
    a determination unit configured to determine the detection object candidate region by referring to the discriminative model.

13. The apparatus according to claim 12, wherein the one or more processors also function as:
    a transforming unit configured to transform the detection object candidate region into a plurality of hierarchical images, and calculate features from each of the plurality of hierarchical images based on a pixel value of the image,
    wherein the determination unit determines the detection object candidate region, based on the output corresponding to the features calculated from each of the plurality of hierarchical images inputted to the discrimination model.

14. The apparatus according to claim 13,
    wherein the transforming unit transforms the detection object candidate region into the plurality of hierarchical images by performing processing of Haar Wavelet transformation.

15. The apparatus according to claim 12, wherein the determination unit determines whether the detection object candidate region is normal or abnormal.

16. The apparatus according to claim 15, wherein the determination unit determines an abnormal type when the detection object candidate region is abnormal.

17. The apparatus according to claim 1,
    wherein the one or more processors performs mask processing with respect to the noise component region.

18. The apparatus according to claim 1,
wherein the identifying unit identifies the noise component region based on an area or length of the detection object candidate region and a pixel value of the region of the reference image corresponding to the detection object candidate region.

19. An image processing method comprising:
inputting an object image and a reference image which corresponds to the object image and is different in pixel value component type from the object image;
detecting a detection object candidate region from the object image based on pixel values of the object image;
extracting at least one feature from a region of the reference image corresponding to the detection object candidate region by using at least the reference image; and
identifying a noise component region from the detection object candidate region based on the feature.

20. A non-transitory computer-readable storage medium storing a program which, when read and executed by a computer, causes the computer to perform the steps of an image processing method, the method comprising:
inputting an object image and a reference image which corresponds to the object image and is different in pixel value component type from the object image;
detecting a detection object candidate region from the object image based on pixel values of the object image;
extracting at least one feature from a region of the reference image corresponding to the detection object candidate region by using at least the reference image; and
identifying a noise component region from the detection object candidate region based on the feature.

* * * * *